Nov. 11, 1969  C. BLOCK ET AL  3,478,316
INVENTORY CONTROL SYSTEM
Filed Dec. 23, 1965
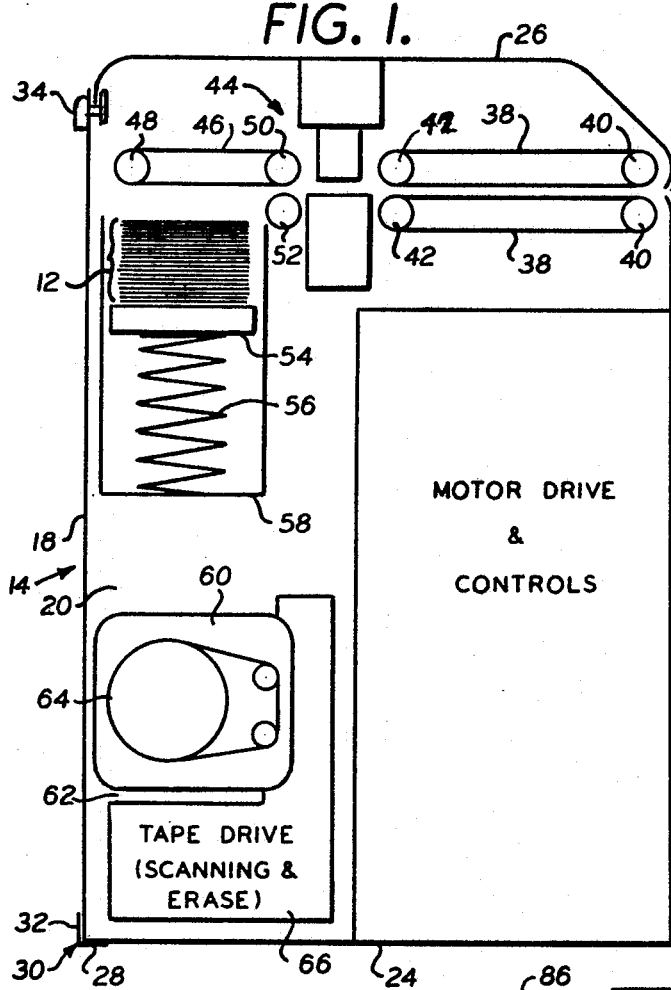
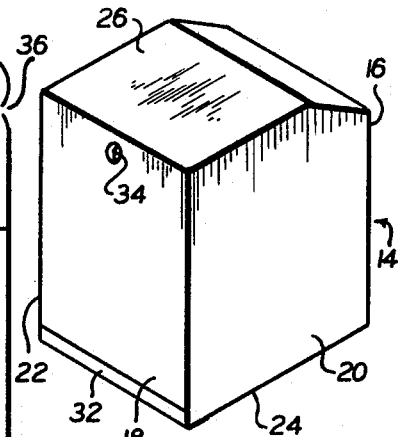
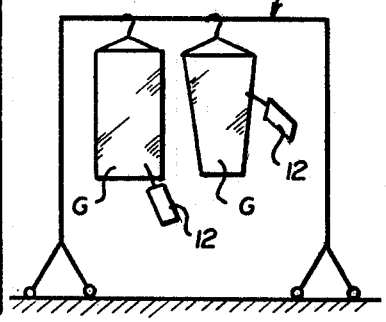
INVENTOR
CHARLES BLOCK
LEON J. MINTZ
BY
ATTORNEY.

United States Patent Office

3,478,316
Patented Nov. 11, 1969

3,478,316
INVENTORY CONTROL SYSTEM
Charles Block, 1129 Albert Road, North Bellmore, N.Y.
11710, and Leon J. Mintz, 7 Valley Road, Syosset,
N.Y. 11791
Filed Dec. 23, 1965, Ser. No. 515,953
Int. Cl. H04q 1/00, 3/00, 9/00
U.S. Cl. 340—147                                    5 Claims

ABSTRACT OF THE DISCLOSURE

A method for controlling inventory by maintaining a current master record of items in inventory and an identification of each separate item of inventory so that as each item is removed from inventory the separate record is scanned and its corresponding identification on the master record is treated in some manner, as by effacement, so as to leave the master record with the corresponding identifications of which items should and should not remain in inventory.

---

This invention relates generally to a system for easily controlling a large inventory of individual items, and more particularly pertains to a system that accurately and efficiently maintains a running record of items of inventory that are not sold or otherwise dispensed through proper channels thereby to notify the operator which items should still be in stock.

Many large scale chain store operations, such as dry cleaning establishments and the like, use extremely cumbersome accounting techniques to keep track of the various items that are submitted to them for clearing. For example, when a garment is brought in to be cleaned, the clerk prepares a ticket in triplicate; one ticket is given to the customer, one ticket is attached to the garment, and the other ticket remains in the sales book as a permanent record. However, because of the mechanics of operation of the conventional chain store operation, it is practically impossible to economically match those articles billed with the corresponding permanent records. As a result, dishonest personnel can charge the customer for the cleaned articles and then throw the bill away rather than deposit the bill in the proper hopper to indicate he has made a sale and collected money therefor. Moreover, due to the sheer numerical weight of the articles in such a system as that described, pilfering or other illegal removal of articles from inventory frequently go undetected.

The desideratum of the present invention is to provide an inventory control system for accurately maintaining a running record of inventoried items so that an operator will be informed immediately which items should still be in inventory. Thus, the operator can simply check the inventory to determine if any items are missing.

Another object of the present invention is to provide an inventory control system wherein authorized personnel only have access to the operative elements of the system. Hence, the possibility of outsiders or unauthorized persons tampering with the system to provide incorrect information is completely eliminated.

Other objects and advantages of the present invention reside in the novel details of construction that provide an inventory control system which includes a pre-recorded tape having bits of data corresponding to items still in inventory recorded thereon. Hence, by simply reading- or printing-out the information on the tape, the operator will have a record of the items remaining in stock.

In this regard, a novel feature of the invention resides in the ability to record, store and erase information or data in a predetermined sequence which results in a material elimination of cumbersome equipment and a subsequent reduction in space and expense from that which would be necessary to read out, index and record the same in an illogical sequence.

Other and further objects of this invention reside in the structures and arrangements hereinafter more fully described with reference to the accompanying drawings in which:

FIG. 1 is a diagrammatic side elevational view of an apparatus constructed according to the present invention, with parts thereof removed to illustrate the structural arrangement of the elements, FIG. 2 is a perspective view of the housing shown in FIG. 1, FIG. 3 is a schematic circuit block diagram of the apparatus shown in FIG. 1, and FIG. 4 is a perspective view illustrating inventoried items which may be controlled by the system of the present invention.

The present invention contemplates the use of respective record cards which are adapted to be releasably connected to each item of the inventoried stock to be controlled. The respective record cards have information or data recorded thereon identifying the associated items such as by different numbers and they also have price information relative to the associated item recorded thereon. The present invention further contemplates the use of a device having a tape or a similar memory unit having numbers prerecorded thereon in sequence corresponding to the identifying numbers on the record cards. When an item is sold or is otherwise dispensed through regular channels, the record card is removed therefrom and placed into the aforementioned device. The device is operable to sense the data or information recorded on the card and to match the identifying number on the sensed card with the corresponding number on the tape. The device is further operable to erase the corresponding number on the tape. This operation is repeated for each item that is sold so that the only numbers remaining on the prerecorded tape will be those numbers corresponding to the items still in inventory. Thus, an up-to-date running logical sequential record of numbers is maintained of all the items in the inventory.

The device is so constructed so only authorized personnel may remove the record cards. Accordingly, the price information on the processed cards may be totaled at the end of a time period and compared with the cash receipts to see if any discrepancies exist. Moreover, the tape may be read- or printed-out and the numbers remaining on the tape may be compared with the inventoried items to determine if any items are missing. Hence, by utilizing the system of the present invention, the operator may immediately check his inventory rather than to have to check through numerous receipt books; a procedure which is extremely time consuming and uneconomical.

The system of the present invention will be described in conjunction with the control of inventory in a dry cleaning chain store operation of the type wherein garments are received at local stores and they are then sent to a main plant to be cleaned. The garments are then returned to the local store where the customers receive the cleaned garments and pay for the services performed. However, it is to be noted that this is by way of illustration only and it is not to be interpreted as a limitation of the present invention. That is, the system of the present invention may be used to control any inventory comprised of a plurality of items which may be too numerous to efficiently maintain accurate up-to-date records of the inventory.

Accordingly, FIG. 4 illustrates a clothing rack 10 having a plurality of garments G suspendingly supported therefrom by hangers. It is to be noted that a conventional chain store dry cleaning establishment has many such racks and each of the clothing racks contains many items which are to be paid for by the customer. Normally, however, it is a simple matter for a dishonest employee to charge for services and not deposit the receipts in the cash register. That is, each garment usually has a tag connected to it with the price for services indicated thereon. When a garment is paid for, the tag is detached and placed in an appropriate hopper. At the end of the day, the tags are removed from the hopper and they are added together. This total should equal the cash on hand. However, if any of the tags are purposely destroyed by a clerk, the operator of the establishment would have no means of determining the monetary loss other than to check through numerous original receipt books; proven to be a rather long, tedious and uneconomical procedure.

In accordance with the system of the present invention, each garment G is given a different identifying numeral and a respective record card 12 is connected to each garment as by a string or a removable clip or staple. In practice, the record cards 12 are IBM cards having the numerical bits of data or information recorded thereon. Thus, each record card 12 has a different identification number recorded thereon corresponding to the identification numeral of the associated garment. Further, each record card may also contain information as to the charge to be made for the respective garment.

The system of the present invention further includes an enclosed housing 14 having a front wall 16, a rear wall 18, opposed side walls 20 and 22, a bottom wall 24 and a top wall 26 (FIGS. 1 and 2). Connected to the rear edge of the bottom wall 24 and extending between the side walls 20 and 22 is the horizontal leg 28 of an L-shaped bracket 30. The rear wall 18 of the cabinet 14 is removable. The bottom edge of the rear wall is received behind vertical leg 32 of the bracket 30 and the top edge thereof is connected to the top wall 26 of the cabinet 14 by a lock 34. Thus, authorized personnel only who have the correct key to the lock 34 can gain access into the interior of the cabinet 14 by opening the lock 34 and lifting the rear wall 18 until it clears the bracket 30.

Provided in the front wall 16 of the cabinet is a slot 36 through which the record cards 12 are individually inserted. Received within the cabinet 14 and positioned above and below the slot 36 are endless belts 38 which are received about drive rolls 40 and idler rolls 42. A motor (not shown) rotates the rolls 40 so that the belts 38 transport a record card received through the slot 36 toward the rear wall 18. Positioned adjacent to the rolls 42 is a record scanning head 44. The scanning head 44 is of conventional nature and it is operable to scan the record card 12 positioned below the head and to convert the identifying number recorded on the scanned or sensed record card into appropriate electrical signals.

Positioned adjacent to the record scanning head 44 is an endless belt 46 that is mounted between a drive roll 48 and an idler roll 50. Below the belt 46 is another idler roll 52. The drive roll 48 is adapted to be rotated by a motor (not shown) in a direction which causes the scanned record card to pass between the belt 46 and the roll 52 and move toward the rear wall 18. Positioned below the belt 46 is a card tray 54 that receives and stacks the scanned record cards 12. The tray 54 is supported by a spring 56 which, in turn, is supported by a shelf 58 in the housing 14. As the number of cards 12 in the tray 54 increases, the tray moves downwardly against the upward bias of the spring 56 so that the distance between the lower run of the belt 46 and the top of the stack remains substantially constant.

Located below the shelf 58 is a tape cartridge 60 that is adapted to be received in a tape cartridge slot 62. Received within the cartridge 60 is a tape 64 that has prerecorded thereon identifying numbers corresponding to the numbers or data recorded on the record cards 12. In practice, the numbers, data or other information are recorded on the tape 64 in the same predetermined or sequential order as that of the cards 12, and each number occupies a different area on the tape 64. A tape driving mechanism, a tape scanning head and a tape erasing head, all of conventional design, are located within a compartment 66 positioned adjacent to the tape cartridge 60.

In operation, a housing 14 is located at each store in the chain of establishments. The lock 34 is opened by authorized personnel and the rear wall 18 of the housing 14 is removed. A tape cartridge 60 having a tape 64 therein which has numbers sequentially prerecorded thereon corresponding to the numbers recorded on the record cards 12 which identify the items of inventory in the particular store of the chain store operation is inserted into the slot 62. Thereafter, the housing 14 is locked. As each garment G is brought into the store, an inventory card or ticket 12 is secured to it. When the garment G is picked up by a customer, the record card 12, connected to the garment and containing the identifying number and possibly the price information thereon, is removed and is inserted into the slot 36. This operation closes a micro-switch (not shown) that causes the belts 38 to transport the card 12 beneath the record scanning head 44.

As noted above, the record scanning head 44 produces an electrical signal dependant upon the sensed inventory number pre-recorded on the scanned record card 12. This signal is applied to a comparator circuit 68 (FIG. 3) through a lead 70. The comparator circuit 68 may comprise a differential amplifier the output of which is connected to the input of a NOR circuit so that the NOR circuit produces an output pulse when no signal is applied to its input. Accordingly, when the input signals to the differential amplifier are of equal amplitude, there will be no output signal and the NOR circuit will produce an output pulse. Additionally, after scanning the card 12, tape drive mechanism 72 is actuated by appropriate means (not shown) to move the tape 64 past a tape scanning head 74. The tape scanning head 74 detects the numbers recorded on the different areas of the tape 64 and converts the scanned data into electrical signals which are applied to the comparator circuit 68 through a lead 76. The comparator circuit 68 compares the signals appearing on the leads 70 and 76. The signals appearing on the leads 76 and 70 will be identical only when the number scanned by the tape scanning head 74 is identical with the number scanned by the record scanning head 44. When this condition occurs, the comparator circuit 68 produces a signal that is applied to the tape drive mechanism 72 through a lead 78 to disable the mechanism. Accordingly, the area of the tape 64 bearing the number corresponding to the number on the record card will be positioned below an erase head 80. Since the position of the tape 64 at the start of any scanning cycle is random, it is possible that that area of the tape 64 containing the number corresponding to the number on the scanned record card 12 has been wound onto the take-up roll of the tape cartridge 60. Thus, if no matching number on the tape 64 has been sensed by the tape scanning head 74 by the time the tape 64 has reached the end of its run, the tape drive mechanism 72 operates to rerun the complete tape past the tape scanning head 74 to insure that the correct data will be positioned below the erase head 80.

The signal produced by the comparator circuit 68 is applied to the erase head 80 through a delay network 82 so that the erase head 80 is energized after the tape device mechanism 72 has been disabled. Thus, the member on the tape corresponding to the number recorded on the scanned record card 12 will be erased in the conventional manner.

Additionally, the signal produced by the comparator circuit 68 is applied to a record card transport apparatus 84 through a delay network 86. The record card transport apparatus 84 controls the operation of the endless belt 46. Moreover, the delay introduced by the network 86 is greater than the delay introduced by the network 82. Thus, the record card transport apparatus 84 will be energized only after the erase head has operated to erase the sensed number. Accordingly, the endless belt 46 moves the scanned record card 12 from its position under the record scanning head 44 on to the tray 54. After this operation has been completed the device is ready to receive and scan another one of the record cards 12 and to erase the corresponding number recorded on that record card from the tape 64 in the same manner as noted above.

At the end of a preselected time interval, such as a day, the stacked record cards 12 may be removed from the housing 14 by authorized personnel by unlocking the lock 34 and removing the rear wall 18. The price information on the cards may then be added and compared to the total cash receipts for the same time period to determine if the balance is correct. Since unauthorized personnel cannot gain access into the interior of the housing 14, it is impossible for a clerk to destroy a record card 12 after it has been placed in the housing. Additionally, when it is desired to check the inventory, the cartridge 60 is placed in a conventional read- or print-out device and the tape 64 is run therethrough to obtain a written logical sequential record of the numbers that have not been erased. It will be obvious that if a number appears on the tape 64, the corresponding record card 12 has not been scanned and, accordingly, the associated garment still should be in stock or inventory. Hence, by checking, in sequence, the list of those numbers remaining on the tape 64 against the remaining inventory, the operator can determine easily whether any garments are missing.

For spot checking the operator may, from time to time, read-out or print-out only a few of the sequentially arranged numbers remaining on the memory 64. He may select these numbers at random from the memory tape 40 and then check them against the correspondingly numbered items remaining in inventory. In this manner, he need not necessarily perform a complete inventory check except at certain preselected intervals.

By the present novel and unique system of prerecording in a logical predetermined sequence data or bits of information, such as numerals in numerical order on both the cards 12 and the memory unit 64, it is then possible to similarly arrange the inventoried articles G in the same sequence in the store. Thus, when the authorized inventory control operator reads-out the memory tape 64, he does so in a logical order. That is to say, the inventory numbers not erased from and still remaining on the tape will be in the same sequence or order as are the articles G that remain in inventory. Hence, each inventoried number or data remaining on and not erased from the tape 64 will read back in the same logical order as they were prerecorded on the tape. This eliminates skipping about seeking out a disordered array of numbers and the logic of the prerecorded information is consistently retained.

The result is a fast and economical system of checking and controlling inventory. The unique yet unusually simple method for accomplishing this results from the prerecording of corresponding information on the record cards or inventory control tickets 12 and memory tapes 64 in the same logical predetermnied sequence and then erasing or deleting such corresponding information from the tapes as each card 12 is sensed. By this method of erasure of information, the ordered and logical sequence of information of articles still remaining in stock is continued.

It will be understood that while a preferred embodiment of the invention has been shown and described herein, numerous omissions, changes and additions may be made in such embodiment without departing from the spirit and scope of the present invention. For example, the print-out device may be incorporated into the housing 14 thereby obviating the necessity for an external print-out mechanism. Additionally, a conventional totalizing device may be incorporated in the electronic circuitry and the record sensing head 44 may be adapted to scan the price information on the record cards so that the totalizing device will automatically add the price information on all scanned record cards to eliminate the necessity to add the scanned record cards 12 when they are removed from the housing 14. Furthermore, although in practice the system described is essentially electrical in operation, a simplified mechanical scanner can be utilized and by effecting a rearrangement of details, the belts and their drives may be obviated.

We claim:
1. A method for controlling an inventory consisting of a plurality of individual items comprising the steps of
   identifying each item of the inventory with a respective record card having identifying means thereon individual to that record card,
   prerecording a visually readable memory means with identifying means corresponding to the different identifying means on the respective record cards on respective different areas of the visually readable memory means,
   scanning the record cards of those items removed from inventory to obtain the respective identifying means thereof,
   locating the identifying means on the prerecorded visually readable memory means corresponding to the identifying means on the scanned record cards,
   and effacing on the visually readable memory means the identifying means so located so that one may visually read directly from the visually readable memory means which identifying means have been effaced and which have not been affaced to see which individual items should and should not remain in inventory.

2. The method of claim 1,
   wherein said identifying means comprises different numbers, and said numbers are recorded on said visually readable memory means in sequential order and the effacing of the identifying means from the visually readable memory means does not vary the sequential order of the identifying means remaining.

3. The method of claim 2,
   and placing the scanned record cards in a locked container so that only authorized personnel may remove the scanned record cards.

4. The method of claim 3,
   wherein said record cards are provided with price information thereon relating to the associated item of inventory,
   said method further comprising the steps of removing said record cards after a predetermined interval of time and totaling the price information thereon.

5. The method of claim 2, including the step of matching the identifying means not effaced on said visually readable memory means against the identifying means on the record cards of those items remaining in inventory to determine if any items are missing from inventory.

References Cited
UNITED STATES PATENTS

| | | |
|---|---|---|
| 2,710,392 | 6/1955 | Jammer _____ 340—153 |
| 2,737,342 | 3/1956 | Nelson. |
| 3,174,142 | 3/1965 | Mallinckrodt. |
| 3,340,509 | 9/1967 | Krause. |
| 3,394,246 | 7/1968 | Goldman. |

JOHN W. CALDWELL, Primary Examiner

M. R. SLOBASKY, Assistant Examiner

U.S. Cl. X.R.

340—149, 153